May 4, 1971  N. E. HOFFMAN  3,577,496
METHOD OF MAKING A SEALED ELECTRICAL CONNECTING DEVICE
Original Filed Sept. 23, 1965  2 Sheets-Sheet 1
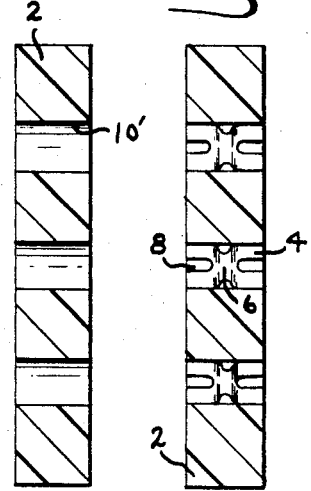
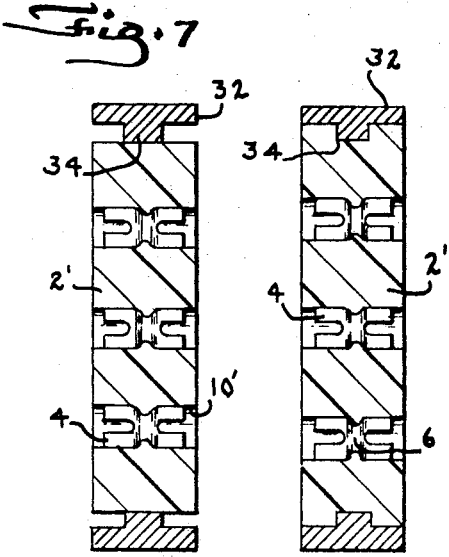
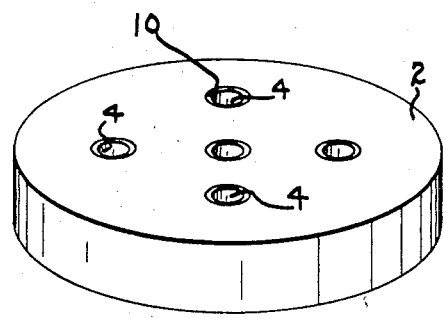
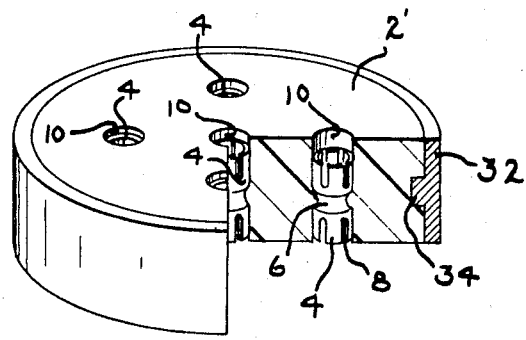
INVENTOR.
NORMAN EDWIN HOFFMAN
BY May 4, 1971 N. E. HOFFMAN 3,577,496
METHOD OF MAKING A SEALED ELECTRICAL CONNECTING DEVICE
Original filed Sept. 23, 1965 2 Sheets-Sheet 2
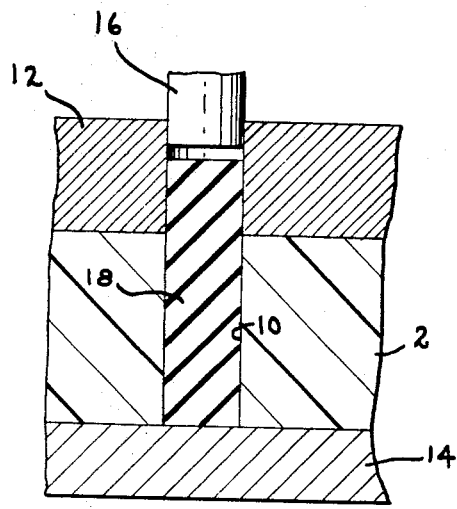
Fig. 9
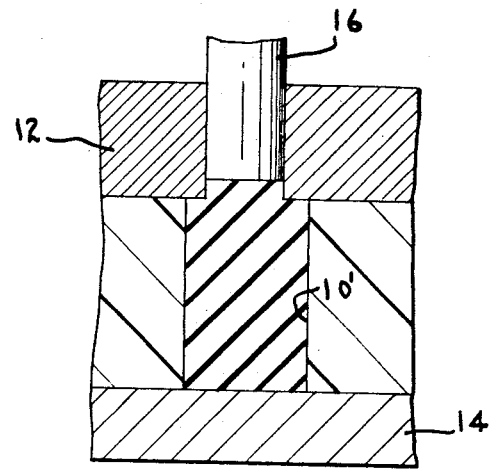
Fig. 10
Fig. 11
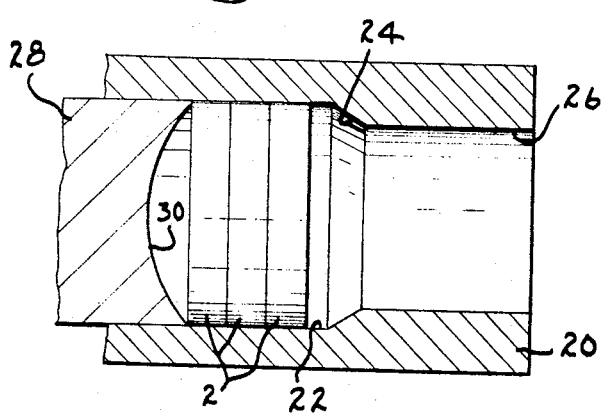
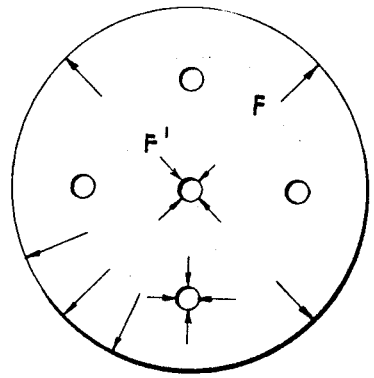
Fig. 12
INVENTOR.
NORMAN EDWIN HOFFMAN
BY United States Patent Office 3,577,496
Patented May 4, 1971

3,577,496
METHOD OF MAKING A SEALED ELECTRICAL CONNECTING DEVICE
Norman Edwin Hoffman, Harrisburg, Pa., assignor to AMP Incorporated, Harrisburg, Pa.
Original application Sept. 23, 1965, Ser. No. 489,697, now Patent No. 3,409,864, dated Nov. 5, 1968. Divided and this application Mar. 21, 1968, Ser. No. 714,829
Int. Cl. B29c 27/16, 27/20
U.S. Cl. 264—156                    1 Claim

ABSTRACT OF THE DISCLOSURE

A sealed assembly is provided and comprises a member formed of thermoplastic material having memory characteristics. An opening extends through the member for receiving an electrical contact, which contact is sealed in place by internal forces within the thermoplastic member. Additional means are provided for surrounding the member and for providing a seal therebetween due to thermal expansion of the member.

This application is a division of my prior copending application Ser. No. 489,697, filed Sept. 23, 1965, now Pat. No. 3,409,864.

This invention relates to sealed electrical connecting devices of the type useful, for example, where conductors must be led through a wall or bulkhead and have a gas and moisture tight seal with the wall or bulkhead. Connecting devices of this type are frequently used in high altitude aircraft where conductors pass through sealed bulkheads and in sealed electrical motors where the winding leads pass through the motor housing. The quality of seal required will vary depending upon the exact circumstances and operating conditions, full hermetic seals being required under many circumstances.

It is an object of the invention to provide an improved sealed connecting device for electrical conductors.

A further object is to provide a sealed connecting device in which the seal can be achieved with relative ease and which provides a high quality seal between an insulating insert and one or more conducting contacts as well as between the insulating insert and a rigid surrounding frame member.

A further object is to provide a sealed connecting device in which the seal is of a high or hermetic quality.

A still further object is to provide a method of achieving a sealed electrical connecting device by the utilization of the memory characteristics of certain thermoplastic materials.

Other objects and advantages of this invention will become apparent as this discussion proceeds.

The objects of the invention are achieved in a preferred embodiment comprising a thermoplastic block or insert having memory characteristics and having a hole extending therethrough in which a conducting contact member is mounted. A relatively rigid frame member is in surrounding relationship to the block or insert, the block being in an internally stressed condition such that it exerts outwardly directed forces against the frame member whereby its periphery is urged against and into sealing engagement with the frame member. At the same time, the block exerts inwardly directed forces against the surface of the conducting contact to establish a seal between the block and the contact. In accordance with one method of practicing the invention, a hole is initially formed in the insert by punching or drilling and is expanded while the insert is in a heat stable condition by application of outwardly directed forces on the sidewalls of the hole until it is enlarged to a diameter sufficient to receive the conducting contact. The contact is thereafter inserted into the hole and the insert will shrink into constrictive relationship with the contact. Thereafter the insert or block is forced through a die while it is maintained at an elevated temperature in a manner such that the insert is elongated and has its cross-sectional dimensions reduced. The insert is cooled while it is in a deformed condition so that it retains a memory of its original shape and dimensions to which it tends to return upon heating. The insert is then positioned in the frame member and heated to a temperature at which it recovers. During such recovery, the sides of the insert move against the frame member to establish the peripheral seal between the insert and the frame member. At the same time, internal stresses are established in the insert as a result of the constricting effect of the frame member which internal stresses enhance the forces imposed upon the conducting contact. Therefore, in accordance with this preferred embodiment of the invention the peripheral seal is achieved by virtue of the increase in cross-section of the insert while it is positioned in the frame member while the seal between the individual contact terminals and the insert is achieved in part by virtue of the previous expansion of the hole in the insert coupled with the internal stresses established in the insert during passage through the die and expansion within the frame member.

In the drawing:

FIG. 1 is a perspective view of a thermoplastic insert having a plurality of holes or openings extending therethrough for reception of conducting contacts;

FIG. 2 is a perspective view, partly in section, showing the insert of FIG. 1 enclosed within a shell or frame member and having the conducting contacts mounted therein;

FIGS. 3 through 8 are cross-sectional views of the insert at various stages of treatment;

FIG. 9 is a cross-sectional view showing a punch assembly for enlarging the holes of the insert of FIG. 1;

FIG. 10 is a view similar to FIG. 9 but showing the punch in its lowered position;

FIG. 11 is a sectional side view of a die and plunger used in accordance with the teachings of this invention; and FIG. 12 is an end view of the insert of FIG. 1 showing the internal forces produced by the method of this invention.

At the outset it should be explained that the practice of the present invention depends in part upon the so called memory characteristics of certain thermoplastic materials. Their memory characteristics can best be explained by assuming that a plastic is heated to a temperature at which its plasticity is substantially increased and it is deformed, as by being forced through a constricted die opening, while it is maintained at this elevated temperature. The plastic is then cooled and will remain in deformed condition indefinitely so long as it is maintained at room temperature. The plastic is said to be in a heat unstable condition after these operations have been carried out for the reason that upon subsequent heating, it will tend to return to its original shape and dimensions by virtue of its memory of those original dimensions. Reference is made to U.S. Pat. 2,027,962 for a more complete explanation of this memory phenomenon. It is known to the art that a variety of thermoplastic compositions possess this memory characteristic including polyethylene, polymethyl methacrylate, polystyrene, and cellulose acetate butyrate compounds. The degree to which a plastic composition of a given class will possess this memory characteristic will depend upon its precise composition, molecular weight, degree of plasticization, and its degree of cross-linking as brought about, for example, by irradiation. The memory characteristics of polyethylene, for example, can be enhanced by irradiation which causes cross-linking of the molecules to the extent that recovery of an original shape after deformation at an elevated temperature will not take place.

A sealed electrical connecting device in accordance with one embodiment of the invention comprises a polyethylene block or insert 2, see FIGS. 1 and 2, having a plurality of conducting contact members 4 which are disposed in holes 10 extending through the polyethylene. The block or insert 2 is mounted in a suitable rigid frame 32 comprising a cylindrical shell member. A connecting device of this type is made by providing a cylindrical block of polyethylene in a heat stable condition and forming, as by punching, a plurality of holes 10 for reception of the contacts 4. The individual contacts may be machined from brass rods and are of cylindrical configuration and have a circumferential recess 6 intermediate their ends. The faces of the contacts 4 are bored as shown at 8 for the reception of contact pins in a mating connecting device. The normal diameter of the holes 10 in the insert 2 is preferably substantially equal to the smallest diameter of the contact 4, that is, the diameter of the recessed portion 6 of the contact.

After formation of the holes 10, the disc is placed between a pair of plates 12, 14, see FIG. 9, the upper plate 12 having a plurality of openings therein in alignment with the openings 10 of the insert 2. The openings 10 are enlarged by positioning a short cylindrical column 18 of deformable material such as rubber in each of the openings 10 and compressing this column 18 by means of a suitable punch 16, FIG. 10 showing the openings 10' having been enlarged by lowering of the punch 16. The openings are enlarged until their diameter is slightly greater than the maximum diameter of the contacts 4 so that the contacts can be inserted into the openings as shown in FIG. 5 after removal of the insert from between the plates 12, 14.

It should be explained that the operations of FIGS. 9 and 10 can conveniently be carried out at room temperature and the openings 10 enlarged by simple elastic deformation of the insert in the vicinity of the openings 10. If this procedure is followed, the contacts 4 must be positioned in the openings shortly after the insert 2 is removed from between the clamping plates 12, 14 for the reason that these openings will have a tendency to return to their normal diameter. In doing so, the walls of these openings will be forced against the sidewalls or the surface portions of the contacts 4 and the sides of the openings will flow to the circumferential recess 6 in the conducting contacts. At this stage, the individual conducting contacts will thus be tightly gripped by the insert 2, although the quality of the seal obtained by this mere elastic enlargement of the openings is not as high as the quality of the seal between the insert in the finished seal connector as will be apparent as this explanation proceeds.

After positioning the conducting contacts 4 in the openings 10, the insert is deformed at an elevated temperature in a manner such that its axial length is increased and its diameter is substantially reduced. This may be done, for example, by forcing the insert 2 through a die 20, see FIG. 11, having a diameter 22 on its left hand side which is substantially equal to the normal or original diameter of the insert. On its right hand side this die has a substantially constricted or reduced diameter portion 26 which communicates with the portion 22 through a tapered neck section 24. The insert is positioned in the section 22 of the die 20 and forced through the die by means of a plunger 28. Advantageously, this plunger has a concave face 30 so that the force applied to the insert while it is being pushed through the die will be concentrated in the areas near the periphery of the insert. This arrangement counteracts the normal tendency of the insert to assume a configuration which would be convex rightwardly as viewed in FIG. 11 due to the extremely high frictional forces developed between the periphery of the insert and the walls of the die. Since the forming operations disclosed in FIG. 11 must be carried out at an elevated temperature, it is advantageous to provide a suitable heating means for the die and plunger.

After the elongated insert emerges from the die 20 it is immediately cooled to room temperature and will then be in a heat unstable condition with a memory of its original shape and dimensions. In this condition, the insert will tend to return to its original dimensions upon heating to the temperature at which it was forced through the die.

The heat unstable insert 2' is then positioned in the cylindrical shell 32, see FIGS. 7 and 8, having an upstanding circumferential rib 34 on its internal surface intermediate its ends. The internal diameter of the shell 32 is advantageously somewhat less than the original diameter of the insert 2 so that when the insert is positioned in the shell and heated to a temperature at which it tends to return to its original dimensions, it will move outwardly radially against the surface of the shell and be securely locked within the shell. As shown in FIG. 8, the internal rib 34 in the shell functions to lock the insert in place and to form an interface of extremely high pressure between the insert and shell.

If the insert is not permitted to expand radially to its original dimensions of FIG. 1, it will be in a highly stressed condition in the finished connecting device. This condition can be achieved by forming the shell 32 with an internal diameter which is less than the normal (i.e. original) diameter of the insert. This high level of internal stress in the insert will cause the periphery of the insert to exert forces, indicated at F in FIG. 12 against the surface of the shell thus establishing a peripheral seal between the shell and the inert. These same internal stresses, however, will react against the surfaces of the individual conducting contacts 4 as indicated at F' in FIG. 12 to assist in establishing the seals between the individual contacts in the inserts. In the finished connecting device in accordance with this embodiment of the invention then, the peripheral seal is achieved by virtue of the combined expansion of the insert in the shell and the resulting stresses which are established in the insert. The seal between the individual contacts and the insert is achieved as a result of three separate but complementary effects, the first of which is the original elastic enlargement of the openings 10 in the insert 2 (FIGS. 9 and 10) and the tendency of the openings 10 to move against the surfaces of the inserts as a result of this enlargement. The second effect is the internal stress resulting from passage of the insert through the die, FIG. 11, with the contacts mounted in the insert. The third effect which contributes to the insert-to-contact seal is the internal stress of the insert after expansion within the confines of the shell member. It will be apparent that the internal stressing of the insert gives rise to forces F' directed against the surfaces of the individual contacts.

As previously pointed out, the invention has utility in a variety of circumstances where sealed connecting devices are required. The relatively simple embodiment shown in FIG. 2 comprises a simple cylindrical shell which could be mounted in an opening in a panel in a manner such that individual connectors could be mated with the contacts 4 on each side of the panel thus to provide a sealed lead through in the panel. Alternatively, the insert or block 2 can be positioned directly in an opening in a pressure type panel and heated to cause it to return to its original dimensions and seal itself peripherally against the edges of the opening. Further, it is to be understood that certain of the parts may vary somewhat from that shown without departing from the scope or spirit of this invention. For example, the conducting contacts, although preferably female, may be male and extend beyond the lateral faces of the insert. Also the particular shape of the internal face of the frame member may be of any irregular configuration, such as inverted tooth, zigzag, or curve.

While a specific embodiment of the invention has been described in the specification and illustrated in the accompanying drawing it will be apparent to those skilled in the art that various changes and modifications can be made without departing from the scope of this invention and that the specific embodiment herein set forth is by way of illustration only, the invention being limited only by the scope of the following claim.

What is claimed is:

1. The method of making a sealed assembly comprising an elongated member mounted in a block of thermoplastic material having memory characteristics, said assembly being sealed at the interface between said elongated member and said block, said method comprising the steps of:
   (a) forming a hole in said thermoplastic block, said hole having a diameter which is less than the diameter of said elongated member,
   (b) enlarging the diameter of said hole by application of pressure to the sidewalls thereof,
   (c) positioning said elongated member in said hole,
   (d) reducing the dimensions of said block in a plane extending transversely of said hole while permitting said block to elongate in the direction of said hole by application of pressure to said block while said block is at an elevated temperature to thereby place said block in a heat unstable condition and to seal said elongated member within said hole,
   (e) cooling said block whereby said block retains said changed dimensions and said elongated member remains sealed within said hole while said block remains in a heat unstable condition,
   (f) providing a frame member with an opening therein, said opening conforming in shape to, but being smaller than, the original cross-section of said block,
   (g) positioning said block in said opening in said frame member, and
   (h) heating said block whereby said block attempts to return to its original shape and dimensions, said block being after heating in peripherally sealed relationship with said frame member by virtue of its having expanded against the sides of said opening, and said block being sealed against said elongated member by virtue of the initial expansion of said hole, the subsequent reduction in size of said block, and the peripheral compressing effect of said frame on said block.

References Cited

UNITED STATES PATENTS

| | | | |
|---|---|---|---|
| 2,027,962 | 1/1936 | Currie | 264—230 |
| 2,458,152 | 1/1949 | Eakins | 264—230 |
| 2,502,240 | 3/1950 | Wiley | 264—230X |
| 2,651,833 | 9/1953 | Kernahan | 264—230X |
| 3,093,526 | 6/1963 | Price | 264—230X |
| 3,130,260 | 4/1964 | Gray | 264—230X |
| 3,153,697 | 10/1964 | Faulkner | 264—229 |
| 3,157,449 | 11/1964 | Hennessey | 264—230X |
| 3,189,672 | 6/1965 | Lyman | 264—249 |
| 3,347,970 | 10/1967 | Hanna | 264—230 |
| 3,396,460 | 8/1968 | Wetmore | 29—629 |

FOREIGN PATENTS

| | | | |
|---|---|---|---|
| 484,849 | 7/1952 | Canada | 264—230 |

ROBERT F. WHITE, Primary Examiner

A. M. SOKAL, Assistant Examiner

U.S. Cl. X.R.

264—229, 230, 249